(12) United States Patent
Binkai et al.

(10) Patent No.: US 10,027,421 B2
(45) Date of Patent: Jul. 17, 2018

(54) COMMUNICATION APPARATUS AND CARRIER WAVE FREQUENCY CONTROL METHOD

(71) Applicant: Mitsubishi Electric Corporation, Chiyoda-ku (JP)

(72) Inventors: Masashi Binkai, Tokyo (JP); Tsuyoshi Yoshida, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/518,682

(22) PCT Filed: Dec. 25, 2015

(86) PCT No.: PCT/JP2015/086176
§ 371 (c)(1),
(2) Date: Apr. 12, 2017

(87) PCT Pub. No.: WO2016/111193
PCT Pub. Date: Jul. 14, 2016

(65) Prior Publication Data
US 2017/0222727 A1 Aug. 3, 2017

(30) Foreign Application Priority Data
Jan. 5, 2015 (WO) .................. PCT/JP2015/086176

(51) Int. Cl.
*H04J 14/02* (2006.01)
*H04B 10/06* (2006.01)
(Continued)

(52) U.S. Cl.
CPC ......... *H04B 10/572* (2013.01); *H04B 10/032* (2013.01); *H04J 14/02* (2013.01); *H04B 10/079* (2013.01)

(58) Field of Classification Search
CPC ...... H04B 10/06; H04B 10/00; H04B 10/572; H04J 14/02; H04J 14/0256
(Continued)

(56) References Cited

U.S. PATENT DOCUMENTS 7,725,033 B2    5/2010  Nakamoto
8,406,635 B2 *  3/2013  Nakashima ............ H04B 10/60
                                                      375/316
(Continued)

FOREIGN PATENT DOCUMENTS

JP    5-219018 A      8/1993
JP    2004-312550 A   11/2004
(Continued)

OTHER PUBLICATIONS

International Search Report dated Feb. 2, 2016, in PCT/JP2015/086176 filed Dec. 25, 2015.
(Continued)

*Primary Examiner* — Ken N Vanderpuye
*Assistant Examiner* — Abbas H Alagheband
(74) *Attorney, Agent, or Firm* — Oblon, McClelland, Maier & Neustadt, L.L.P.

(57) ABSTRACT

A communication apparatus including: an optical transmission device including transceivers to transmit and receive optical signals at carrier wave frequencies different from one another; a multiplexing unit to subject the optical signals input from the transceivers to frequency multiplexing; an auxiliary transceiver to perform mixing interference of a frequency multiplexing signal and a local emission light signal having the same frequency setting as a carrier wave frequency used in a control target transceiver, to generate and output a control signal for correcting the carrier wave frequency of the control target transceiver, the auxiliary transceiver being a spare transceiver for the plurality of
(Continued)

transceivers; and a control unit to perform control to output, to the control target transceiver, the control signal input from the auxiliary transceiver.

1 Claim, 11 Drawing Sheets

(51) Int. Cl.
*H04B 10/572* (2013.01)
*H04B 10/032* (2013.01)
*H04B 10/079* (2013.01)

(58) Field of Classification Search
USPC ....... 398/79, 95, 94, 33, 196, 197, 162, 159, 398/38, 208, 65, 91, 5, 68
See application file for complete search history.

(56) References Cited

U.S. PATENT DOCUMENTS

| | | | | |
|---|---|---|---|---|
| 8,467,676 | B2* | 6/2013 | Villarruel | H04B 10/032 398/10 |
| 8,855,498 | B2* | 10/2014 | Tanaka | H04B 10/5055 398/159 |
| 9,258,065 | B2* | 2/2016 | Salsi | H04B 10/61 |
| 9,485,012 | B2* | 11/2016 | Rahn | H04B 10/506 |
| 9,537,577 | B2* | 1/2017 | Rahn | H04J 14/0256 |
| 9,698,905 | B2* | 7/2017 | Saito | H04B 10/07957 |
| 2006/0088319 | A1* | 4/2006 | Morton | H04B 10/506 398/79 |
| 2009/0202196 | A1* | 8/2009 | Kish, Jr. | B82Y 20/00 385/14 |
| 2009/0245815 | A1* | 10/2009 | Zhang | H04B 10/61 398/208 |
| 2010/0183294 | A1* | 7/2010 | Villarruel | H04B 10/032 398/10 |
| 2010/0189445 | A1* | 7/2010 | Nakashima | H04B 10/60 398/152 |
| 2013/0051803 | A1* | 2/2013 | Kato | H04J 14/02 398/79 |
| 2013/0209095 | A1* | 8/2013 | Barnard | H04B 10/572 398/34 |
| 2013/0302028 | A1* | 11/2013 | Barnard | H04B 10/572 398/25 |
| 2014/0099110 | A1 | 4/2014 | Oyama et al. | |
| 2015/0023674 | A1* | 1/2015 | Salsi | H04B 10/61 398/202 |
| 2015/0244494 | A1* | 8/2015 | Grobe | H04J 14/0278 398/68 |
| 2015/0381276 | A1* | 12/2015 | Saito | H04B 10/07957 398/34 |
| 2016/0112118 | A1* | 4/2016 | Rahn | H04B 10/032 398/5 |
| 2016/0112141 | A1* | 4/2016 | Rahn | H04J 14/0256 398/79 |
| 2016/0204875 | A1* | 7/2016 | Araki | H04B 10/572 398/34 |

FOREIGN PATENT DOCUMENTS

| | | |
|---|---|---|
| JP | 2007-104008 A | 4/2007 |
| JP | 2009-253971 A | 10/2009 |
| JP | 2014-78834 A | 5/2014 |
| WO | WO 2015/146105 A1 | 10/2015 |

OTHER PUBLICATIONS

Written Opinion of the International Searching Authority dated Feb. 2, 2016, in PCT/JP2015/086176 filed Dec. 25, 2015.
Combined Office Action and Search Report issued Dec. 25, 2017 in Chinese patent Application No. 201580069667.X (with partial English translation and English translation of category of cited documents).

* cited by examiner

| n | CARRIER WAVE FREQUENCY $f_n$ | CHANNEL NUMBER C | FREQUENCY OFFSET AMOUNT $\Delta F_n$[GHz] |
|---|---|---|---|
| 1 | $f_1$ | 1 | 0 |
| 2 | $f_2$ | 3 | -10 |
| 3 | $f_3$ | 4 | 5 |
| 4 | $f_4$ | 6 | -5 |
| 5 | $f_5$ | 8 | -5 |
| 6 | $f_6$ | 9 | +3.3 |
| 7 | $f_7$ | 10 | +11.6 |

COMMUNICATION APPARATUS AND CARRIER WAVE FREQUENCY CONTROL METHOD

FIELD

The present invention relates to a communication apparatus that subjects optical signals to frequency multiplexing for communication, and a carrier wave frequency control method.

BACKGROUND

In a conventional optical transmission system, a super channel technique that subjects a plurality of subcarriers to high-density frequency multiplexing has been attracting attention for increasing the capacity of a trunk optical communication network. In the optical transmission system, narrow band reception by coherent detection and spectral shaping and waveform restoration by a digital signal processing contribute to the realization of the high-density frequency multiplexing. Meantime, an oscillation frequency deviation in a wavelength variable light source that occurs on the order of GHz causes crosstalk between the subcarriers and results in characteristic deterioration. The super channel technique that arranges frequency intervals in high density is significantly influenced by this problem.

In this regard, Patent Literature 1 below discloses a technique for transmitting a reduced optical power of a specific wavelength from a transmission side, and evaluating, at a reception side, a channel crosstalk amount from a bit error rate of a channel adjacent to the specific wavelength. A deviation in the wavelength of the channel having the optical power reduced is detected on the basis of the channel crosstalk amount, and the wavelength deviation of the channel having the optical power reduced at the transmission side is compensated.

CITATION LIST

Patent Literature

Patent Literature 1: Japanese Patent Application Laid-Open No. 2007-104008

SUMMARY

Technical Problem

According to the above-mentioned conventional technique, a carrier wave frequency is controlled on the basis of the bit error rate. However, the bit error rate is likely to fluctuate due to not only the crosstalk amount but also deterioration caused by a fiber nonlinear optical effect in a transmission path. This causes a problem of a lack of precision in the correction to the frequency deviation.

The present invention has been made in view of the foregoing, and an object of the present invention is to obtain a communication apparatus capable of controlling a carrier wave frequency with high accuracy.

Solution to Problem

To solve the problem and achieve the object, the present invention provides a communication apparatus comprising: an optical transmission device including a plurality of transceivers to transmit and receive optical signals at carrier wave frequencies different from one another; a multiplexing unit to subject the optical signals input from the plurality of transceivers to frequency multiplexing, and output a frequency multiplexing signal; an auxiliary transceiver to perform mixing interference of the frequency multiplexing signal and a local emission light signal having a same frequency setting as a carrier wave frequency used in a control target transceiver, to generate and output a control signal for correcting the carrier wave frequency of the control target transceiver, the auxiliary transceiver being a spare transceiver for the plurality of transceivers; and a control unit to perform control to output, to the control target transceiver, the control signal input from the auxiliary transceiver.

Advantageous Effects of Invention

A communication apparatus according to the present invention achieves an effect of being capable of controlling a carrier wave frequency with a high degree of accuracy.

DESCRIPTION OF EMBODIMENTS

Hereinafter, a communication apparatus and a carrier wave frequency control method according to embodiments of the present invention will be described in detail based on the drawings. The present invention is not limited to the embodiments.

First Embodiment

Figure 1:
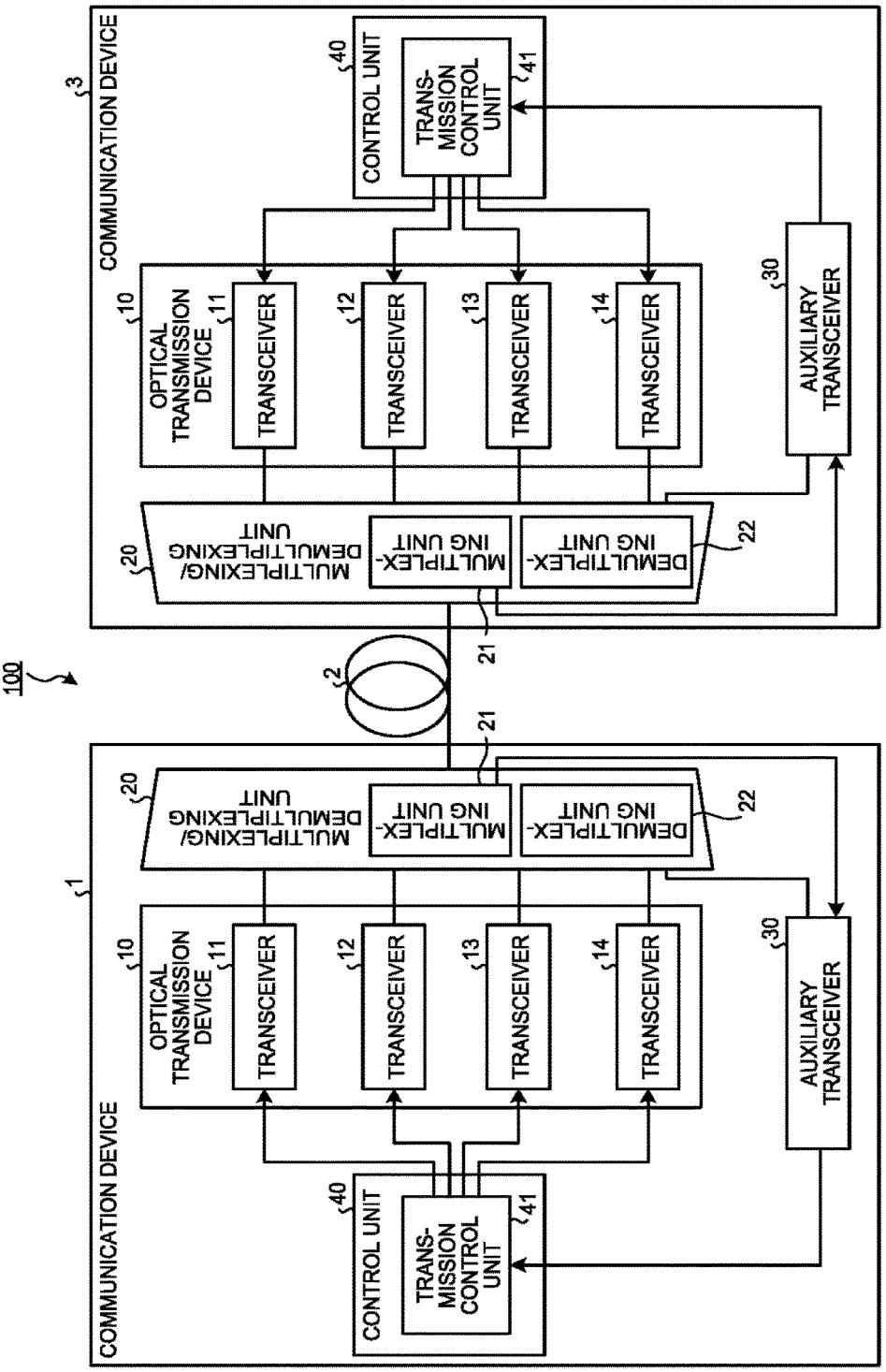
FIG. 1 is a diagram illustrating an exemplary configuration of an optical transmission system including communication apparatuses according to a first embodiment.

FIG. 1 is a diagram illustrating an exemplary configuration of an optical transmission system 100 including communication apparatuses 1 and 3 according to a first embodiment of the present invention. In the optical transmission system 100, the communication apparatus 1 and the communication apparatus 3 communicate with each other through a transmission path 2 using optical signals subjected to frequency multiplexing. The description herein supposes the optical transmission system 100 that subjects four subcarriers to the frequency multiplexing. However, this is only an example, and the number of subcarriers to be subjected to the frequency multiplexing is not limited to four. Since the communication apparatuses 1 and 3 have the same configuration, hereinafter, the configuration and operation will be described using the communication apparatus 1.

The communication apparatus 1 includes an optical transmission device 10, a multiplexing/demultiplexing unit 20, an auxiliary transceiver 30, and a control unit 40.

The optical transmission device 10 includes four transceivers 11, 12, 13 and 14 that transmit and receive optical signals using carrier wave frequencies different from one another. The multiplexing/demultiplexing unit 20 includes a multiplexing unit 21 and a demultiplexing unit 22. The multiplexing unit 21 outputs, to the transmission path 2 and the auxiliary transceiver 30, a frequency multiplexing signal that is the optical signals input from the transceivers 11 to 14 and subjected to the frequency multiplexing. The demultiplexing unit 22 demultiplexes, into respective carrier wave frequencies, the frequency multiplexing signal output from the communication apparatus 3 and input through the transmission path 2, and outputs the signals of these carrier wave frequencies to the corresponding transceivers 11 to 14. The auxiliary transceiver 30 performs mixing interference of the frequency multiplexing signal and a local emission light signal having the same frequency setting as the carrier wave frequency used in a control target transceiver, to generate a control signal for correcting the carrier wave frequency of the control target transceiver, such that the auxiliary transceiver 30 performs control to correct carrier wave frequencies $f_1$ to $f_4$ used in the transceivers 11 to 14. The control unit 40 includes a transmission control unit 41 that performs control to distribute and transmit the control signal input from the auxiliary transceiver 30 to one of the transceivers 11 to 14 that is a control target. The control target transceiver is one of the transceivers 11 to 14 that is a target having the carrier wave frequency that is to be corrected.

In the communication apparatus 1, the transceiver 11 transmits and receives the optical signal at the carrier wave frequency $f_1$. The transceiver 12 transmits and receives the optical signal at the carrier wave having the frequency $f_2$ set a frequency interval $\Delta F$ distant from the carrier wave frequency $f_1$. The transceiver 13 transmits and receives the optical signal at the carrier wave frequency $f_3$ set the frequency interval $\Delta F$ distant from the carrier wave frequency $f_2$. The transceiver 14 transmits and receives the optical signal at the carrier wave frequency $f_4$ set the frequency interval $\Delta F$ distant from the carrier wave frequency $f_3$.

In the communication apparatus 1, the transceivers 11 to 14 of the optical transmission device 10 output the optical signals of the carrier wave frequencies $f_1$ to $f_4$. The multiplexing unit 21 of the multiplexing/demultiplexing unit 20 subjects the optical signals input from the transceivers 11 to 14, to the frequency multiplexing, transmits the frequency multiplexing signal to the communication apparatus 3 through the transmission path 2, and outputs the frequency multiplexing signal from a monitor port to the auxiliary transceiver 30. In the communication apparatus 3 that has received the frequency multiplexing signal through the transmission path 2, the demultiplexing unit 22 of the multiplexing/demultiplexing unit 20 demultiplexes the frequency multiplexing signal into the carrier wave frequencies $f_1$ to $f_4$, and outputs them to the corresponding transceivers 11 to 14. In the optical transmission system 100 illustrated in FIG. 1, the communication apparatuses 1 and 3 bi-directionally communicate with each other. Therefore, in the same manner as discussed above, the respective transceivers 11 to 14 of the communication apparatus 3 output the optical signals of the carrier wave frequencies $f_1$ to $f_4$, and the multiplexing unit 21 performs the frequency multiplexing on the optical signals and transmits the resultant signal to the communication apparatus 1. Then, in the communication apparatus 1, the demultiplexing unit 22 demultiplexes the frequency multiplexing signal into the carrier wave frequencies $f_1$ to $f_4$, and outputs the signals of these carrier wave frequencies to the corresponding transceivers 11 to 14.

Figure 2:
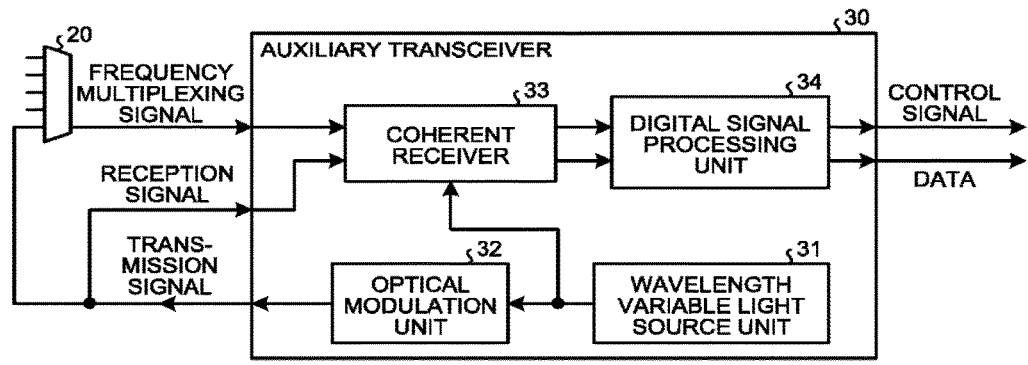
FIG. 2 is a block diagram illustrating an exemplary configuration of an auxiliary transceiver according to the first embodiment.

Next, a configuration of the auxiliary transceiver 30 will be described. FIG. 2 is a block diagram illustrating an exemplary configuration of the auxiliary transceiver 30 according to the first embodiment of the present invention. The auxiliary transceiver 30 includes a wavelength variable light source unit 31, an optical modulation unit 32, a coherent receiver 33, and a digital signal processing unit 34. The wavelength variable light source unit 31 is a light source unit capable of changing the carrier wave frequency and outputting a local emission light signal that is an optical signal. The optical modulation unit 32 is a modulation unit that modulates the local emission light signal input from the wavelength variable light source unit 31, to generate a transmission signal. The coherent receiver 33 is a synchronization detection unit that converts, into an electric signal for frequency-offset-amount calculation, an optical signal extracted by the mixing interference of the frequency multiplexing signal input from the multiplexing unit 21 of the multiplexing/demultiplexing unit 20 and the local emission light signal input from the wavelength variable light source unit 31. The coherent receiver 33 also converts, into an electric signal for data demodulation, an optical signal extracted by the mixing interference of the demultiplexed optical signal, input from the demultiplexing unit 22 of the multiplexing/demultiplexing unit 20, and the local emission light signal, input from the wavelength variable light source unit 31. The digital signal processing unit 34 is a signal processing unit that calculates a frequency offset amount between the carrier wave frequency of the control target transceiver and the carrier wave frequency of the local emission light signal by digital signal processing using the electric signal for frequency-offset-amount calculation resulting from the conversion in the coherent receiver 33. The digital signal processing unit 34 then generates a control signal that is information on the frequency offset amount, and outputs the control signal to the control unit 40. The signal processing unit 34 also compensates signal deterioration and performs the demodulation to obtain the original data, by digital signal processing using the electric signal for data demodulation resulting from the conversion in the coherent receiver 33. In the auxiliary transceiver 30, the local emission light signal output from the wavelength variable light source unit 31 branches into two, which are used for a light source in the optical modulation unit 32 and a light source in the coherent receiver 33.

Meanwhile, the process of restoring the original data from the demultiplexed optical signal in the coherent receiver 33 and the digital signal processing unit 34 is the same as data restoration processing by digital coherent receiving technique that has been conventionally used. Then, in the coherent receiver 33 and the digital signal processing unit 34, the frequency offset amount between the carrier wave frequency of the local emission light signal and the carrier wave frequency of the optical signal having the superimposed data to be restored is obtained and the information on the frequency offset amount is used for the data restoration processing. Therefore, the coherent receiver 33 and the digital signal processing unit 34 of the present embodiment can obtain the frequency offset amount by utilizing a computation function performed in the conventional data restoration processing without requiring an additional new computation function.

Figure 3:
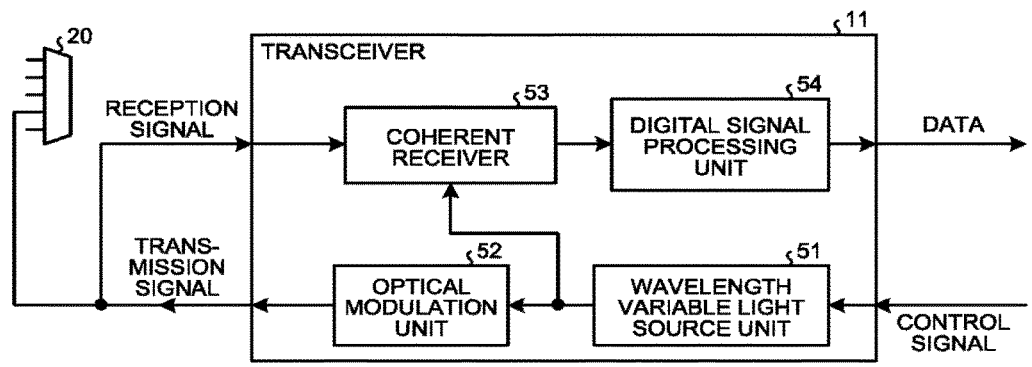
FIG. 3 is a block diagram illustrating an exemplary configuration of a transceiver according to the first embodiment.

Next, configurations of the transceivers 11 to 14 will be described. Since the transceivers 11 to 14 have the same configuration, the description will be provided using the transceiver 11. FIG. 3 is a block diagram illustrating an exemplary configuration of the transceiver 11 according to the first embodiment of the present invention. The transceiver 11 includes a wavelength variable light source unit 51, an optical modulation unit 52, a coherent receiver 53, and a digital signal processing unit 54. The wavelength variable light source unit 51 is capable of changing the carrier wave frequency on the basis of the control signal input from the control unit 40 and outputting a local emission light signal that is an optical signal. The optical modulation unit 52 is a modulation unit that modulates the local emission light signal input from the wavelength variable light source unit 51 to generate a transmission signal. The coherent receiver 53 is a synchronization detection unit that converts, into an electric signal, an optical signal extracted by the mixing interference of the demultiplexed optical signal, input from the demultiplexing unit 22 of the multiplexing/demultiplexing unit 20, and the local emission light signal, input from the wavelength variable light source unit 51. The digital signal processing unit 54 is a signal processing unit that compensates signal deterioration and performs the demodulation to obtain the original data, by means of digital signal processing using the electric signal resulting from the conversion in the coherent receiver 53. In the transceiver 11, the local emission light signal output from the wavelength variable light source unit 51 branches into two, which are used for a light source in the optical modulation unit 52 and a light source in the coherent receiver 53.

When any one of the transceivers 11 to 14 breaks down, the auxiliary transceiver 30, which includes the same configuration as those of the transceivers 11 to 14, as discussed above, can be used as an alternative transceiver to the broken transceiver in the optical transmission device 10.

Figure 4:
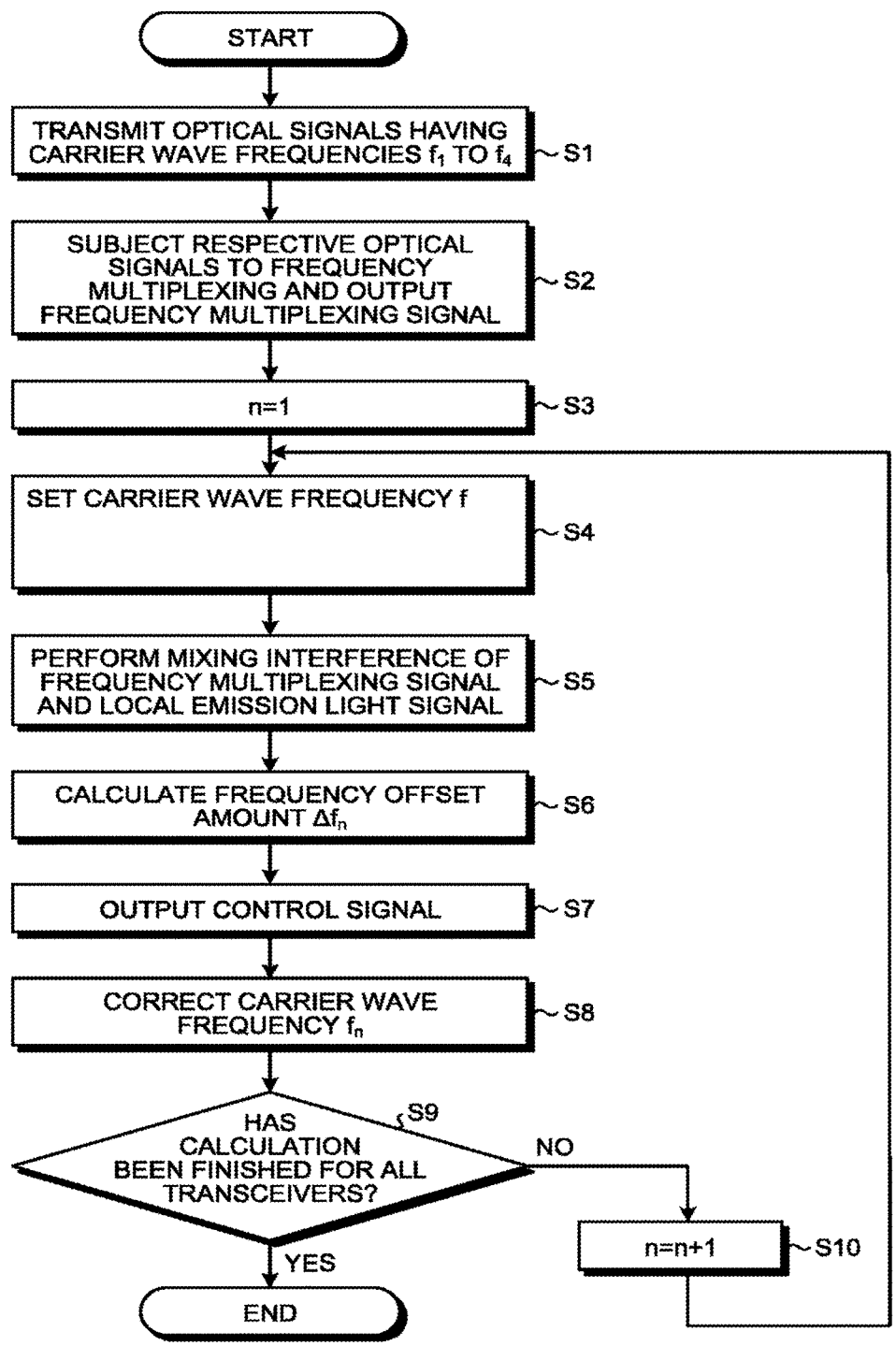
FIG. 4 is a flowchart illustrating operation of correcting carrier wave frequencies of the transceivers in the communication apparatus according to the first embodiment.

Next, an operation of correcting the carrier wave frequencies of the transceivers 11 to 14 in the communication apparatus 1 will be described. FIG. 4 is a flowchart illustrating the operation of correcting the carrier wave frequencies of the transceivers 11 to 14 in the communication apparatus 1 according to the first embodiment of the present invention.

First, in the communication apparatus 1, the transceivers 11 to 14 transmit the optical signals at the respective carrier wave frequencies $f_1$ to $f_4$ (step S1). At this time, the carrier wave frequencies $f_1$ to $f_4$ of the optical signals transmitted from the transceivers 11 to 14, which are generated in the different wavelength variable light source units 51 provided in the respective transceivers 11 to 14, can include a frequency deviation on the order of GHz.

The multiplexing unit 21 subjects the respective optical signals input from the transceivers 11 to 14, to the frequency multiplexing, transmits the frequency multiplexing signal to the communication apparatus 3 through the transmission path 2, and outputs the frequency multiplexing signal from the monitor port to the auxiliary transceiver 30 (step S2). In the auxiliary transceiver 30, the coherent receiver 33 receives the input of the frequency multiplexing signal output from the multiplexing unit 21.

In the wavelength variable light source unit 31 of the auxiliary transceiver 30, an identification number n of the carrier wave frequency is set to 1, i.e., n=1 (step S3), a carrier wave frequency $f_1'$ is set, and the local emission light signal is output (step S4). Although the carrier wave frequency has the same frequency setting as the carrier wave frequency $f_1$ used in the transceiver 11, it is presumed that an error on the order of GHz can be included due to an individual difference between the wavelength variable light source unit 51 of the transceiver 11 and the wavelength variable light source unit 31 of the auxiliary transceiver 30.

In the auxiliary transceiver 30, the coherent receiver 33 performs the mixing interference of the frequency multiplexing signal and the local emission light signal that is the local emission light signal of the carrier wave frequency $f_1'$ input from the wavelength variable light source unit 31 (step S5). The coherent receiver 33 converts the optical signal extracted by the mixing interference into the electric signal for frequency-offset-amount calculation, and outputs the electric signal to the digital signal processing unit 34.

In the auxiliary transceiver 30, the digital signal processing unit 34 calculates a frequency offset amount $\Delta f_1$ that is a deviation amount of the frequency between the carrier wave frequency $f_1$ of the control target transceiver 11 and the carrier wave frequency $f_1'$ of the local emission light signal by the digital signal processing using the electric signal input from the coherent receiver 33 (step S6). The digital signal processing unit 34 outputs, to the control unit 40, the information on the calculated frequency offset amount $\Delta f_1$ as the control signal for the transceiver 11.

In the control unit 40, the transmission control unit 41 outputs, to the control target transceiver 11, the control signal for the transceiver 11 input from the digital signal processing unit 34 (step S7).

Then, in the transceiver 11, the wavelength variable light source unit 51 controls the carrier wave frequency by the frequency offset amount $\Delta f_1$ on the basis of the control signal for the transceiver 11 input from the control unit 40, to correct the carrier wave frequency $f_1$ to the carrier wave frequency $f_1'$ (step S8).

Figure 5:
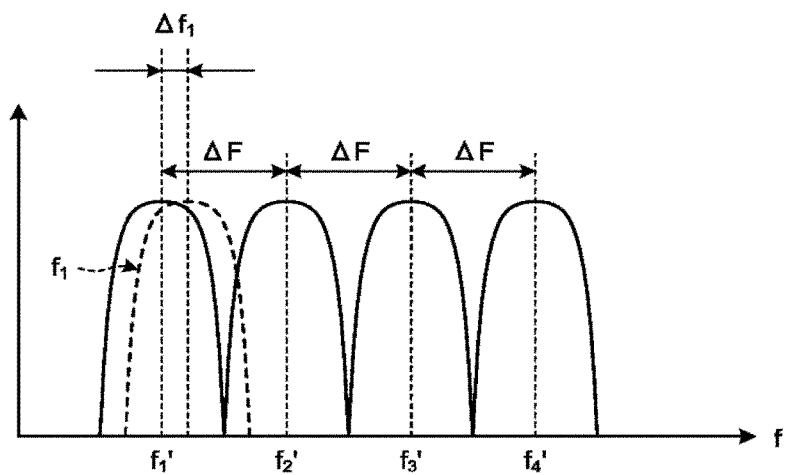
FIG. 5 is a diagram illustrating a state after correcting a carrier wave frequency $f_1$ to a carrier wave frequency $f_1'$ in the transceiver according to the first embodiment.

FIG. 5 is a diagram illustrating a state after correcting the carrier wave frequency $f_1$ to the carrier wave frequency $f_1'$ in the transceiver 11 according to the first embodiment. Carrier wave frequencies $f_1'$ to $f_4'$ are the carrier wave frequencies that should be used in principle without an error in the wavelength variable light source units 51 of the transceivers 11 to 14 being taken into consideration. The adjacent ones of the carrier wave frequencies $f_1'$ to $f_4'$ have the relation of the frequency intervals ΔF therebetween in a case where no frequency deviation exists. Although the transceiver 11 should have used the carrier wave frequency $f_1'$, the transceiver 11 has actually used the carrier wave frequency $f_1$ deviating by the frequency offset amount $\Delta f_1$. Therefore, the carrier wave frequency $f_1$ is corrected to the carrier wave frequency $f_1'$, whereby the interval between the carrier wave frequency $f_1'$ and the carrier wave frequency $f_2'$ used in the transceiver 12 can be maintained at the frequency interval ΔF.

When the auxiliary transceiver 30 has not yet finished the calculation of the frequency offset amounts of the carrier wave frequencies $f_1'$ to $f_4'$ for all the transceivers 11 to 14 provided in the optical transmission device 10 (step S9: No), n=n+1 is set, that is, an increment is added to n to set n=1+1=2 (step S10). Then, the operation returns to step S4, and the operations of steps S4 to S8 are performed, such that a frequency offset amount $\Delta f_2$ of the transceiver 12 is calculated, and the control to correct the carrier wave frequency $f_2$ of the transceiver 12 to the carrier wave frequency $f_2'$ is performed. In the auxiliary transceiver 30, the operations of steps S4 to S8 are repeatedly performed. Consequently, a frequency offset amount $\Delta f_3$ of the transceiver 13 is calculated, and the control to correct the carrier wave frequency $f_3$ of the transceiver 13 to the carrier wave frequency $f_3'$ is performed. A frequency offset amount $\Delta f_4$ of the transceiver 14 is also calculated, and the control to correct the carrier wave frequency $f_4$ of the transceiver 14 to the carrier wave frequency $f_4'$ is performed.

When the auxiliary transceiver 30 has finished the calculation of the frequency offset amounts of the carrier wave frequencies $f_1'$ to $f_4'$ for all the transceivers 11 to 14 provided in the optical transmission device 10 (step S9: Yes), the operation of correcting the carrier wave frequencies is finished.

In the present embodiment, the frequency multiplexing signal is input from the monitor port of the multiplexing unit 21, and the frequency offset amounts $\Delta f_1$ to $\Delta f_4$ of the carrier wave frequencies $f_1$ to $f_4$ of the transceivers 11 to 14 can be calculated in the communication apparatus 1. Therefore, the carrier wave frequencies can be controlled in real time even during the operation of the optical transmission system 100.

Generally, each of the wavelength variable light source units 31 and 51 detects frequency information using an optical filer having a periodic wavelength transmission characteristic, and stably controls an oscillation frequency. In the wavelength variable light source units 31 and 51, a wavelength deviation occurs in the transmission characteristic due to temperature fluctuation or the like. However, a deviation amount of a period is equal to or less than one-thousandth of a deviation amount of an absolute value. In the communication apparatus 1, therefore, under an environment having a stable temperature, the carrier wave frequencies $f_1$ to $f_4$ of the transceivers 11 to 14 are corrected using one wavelength variable light source unit 31 as a reference, whereby the frequency intervals ΔF among the carrier wave frequencies $f_1$ to $f_4$ can be controlled on the order of 50 MHz or less.

Furthermore, in the communication apparatus 1, the carrier wave frequencies $f_1$ to $f_4$ of the transceivers 11 to 14 are controlled while the frequency multiplexing signal is always monitored. Consequently, the frequency deviations caused by the aging of the respective wavelength variable light source units 51 of the transceivers 11 to 14 can be detected, and the frequency intervals ΔF among the carrier wave frequencies $f_1$ to $f_4$ can be stably controlled. For example, in the digital signal processing unit 34 of the auxiliary transceiver 30 of the communication apparatus 1, the frequency offset amounts $\Delta f_1$ to $\Delta f_4$ of the transceivers 11 to 14 are periodically calculated to periodically correct the carrier wave frequencies $f_1$ to $f_4$ of the transceivers 11 to 14.

Figure 6:
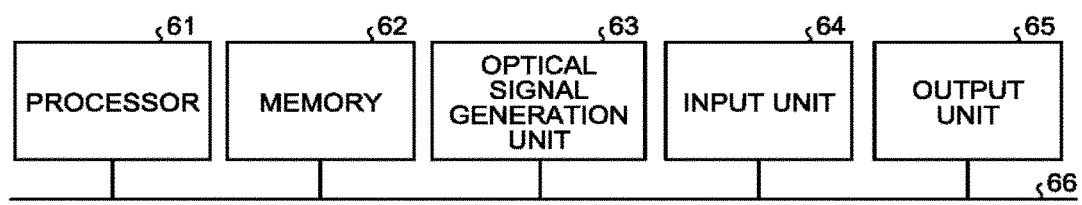
FIG. 6 is a diagram illustrating a hardware configuration of the auxiliary transceiver according to the first embodiment.

Hereinafter, a hardware configuration that realizes each configuration in the block diagram of the auxiliary transceiver 30 illustrated in FIG. 2 will be described. FIG. 6 is a diagram illustrating the hardware configuration of the auxiliary transceiver 30 according to the first embodiment. The wavelength variable light source unit 31 is realized by a processor 61 that executes a program stored in a memory 62, and an optical signal generation unit 63. The optical modulation unit 32 is realized by the processor 61 that executes the program stored in the memory 62, and an output unit 65. The coherent receiver 33 is realized by the processor 61 that executes the program stored in the memory 62, and an input unit 64. The digital signal processing unit 34 is realized by the processor 61 that executes the program stored in the memory 62, and the output unit 65. The processor 61, the memory 62, the optical signal generation unit 63, the input unit 64, and the output unit 65 are connected by a system bus 66. In the auxiliary transceiver 30, a plurality of processors 61 and a plurality of memories 62 may cooperate to execute the function of each configuration illustrated in the block diagram of FIG. 2. Although the auxiliary transceiver 30 can be realized by the hardware configuration illustrated in FIG. 6, the auxiliary transceiver 30 can be implemented using either software or hardware.

As described above, in the communication apparatus 1 according to the present embodiment, the carrier wave frequencies $f_1$ to $f_4$ of the respective transceivers 11 to 14 of the optical transmission device 10 are corrected on the basis of the carrier wave frequency of the wavelength variable light source unit 31 provided in the auxiliary transceiver 30 and serving as one reference. Consequently, in the communication apparatus 1, the carrier wave frequencies $f_1$ to $f_4$ of the transceivers 11 to 14 can be controlled with a high degree of accuracy by utilizing the periodic characteristic of the wavelength variable light source unit 31 and the frequency offset estimation function provided by the digital signal processing, such that the carrier wave frequencies $f_1$ to $f_4$ can be arranged at the frequency intervals ΔF on the order of 50 MHz or less with high accuracy.

In the communication apparatus 1, the transmission and the reception of the optical signal to and from the other communication apparatus 3 are not required for the correction to the carrier wave frequencies $f_1$ to $f_4$ of the respective transceivers 11 to 14. Therefore, the control over the carrier wave frequencies can be performed in the communication apparatus 1. In the communication apparatus 1, the respective carrier wave frequencies do not need to become extinct even during the operation of the optical transmission system 100. Therefore, the carrier wave frequencies can be controlled in real time, such that the optical frequency deviation caused by the aging of the wavelength variable light source unit 51 can be corrected.

Second Embodiment

In a second embodiment, frequency intervals among a plurality of carrier wave frequencies are controlled to be predetermined frequency intervals. A part different from the first embodiment will be described.

Figure 7:
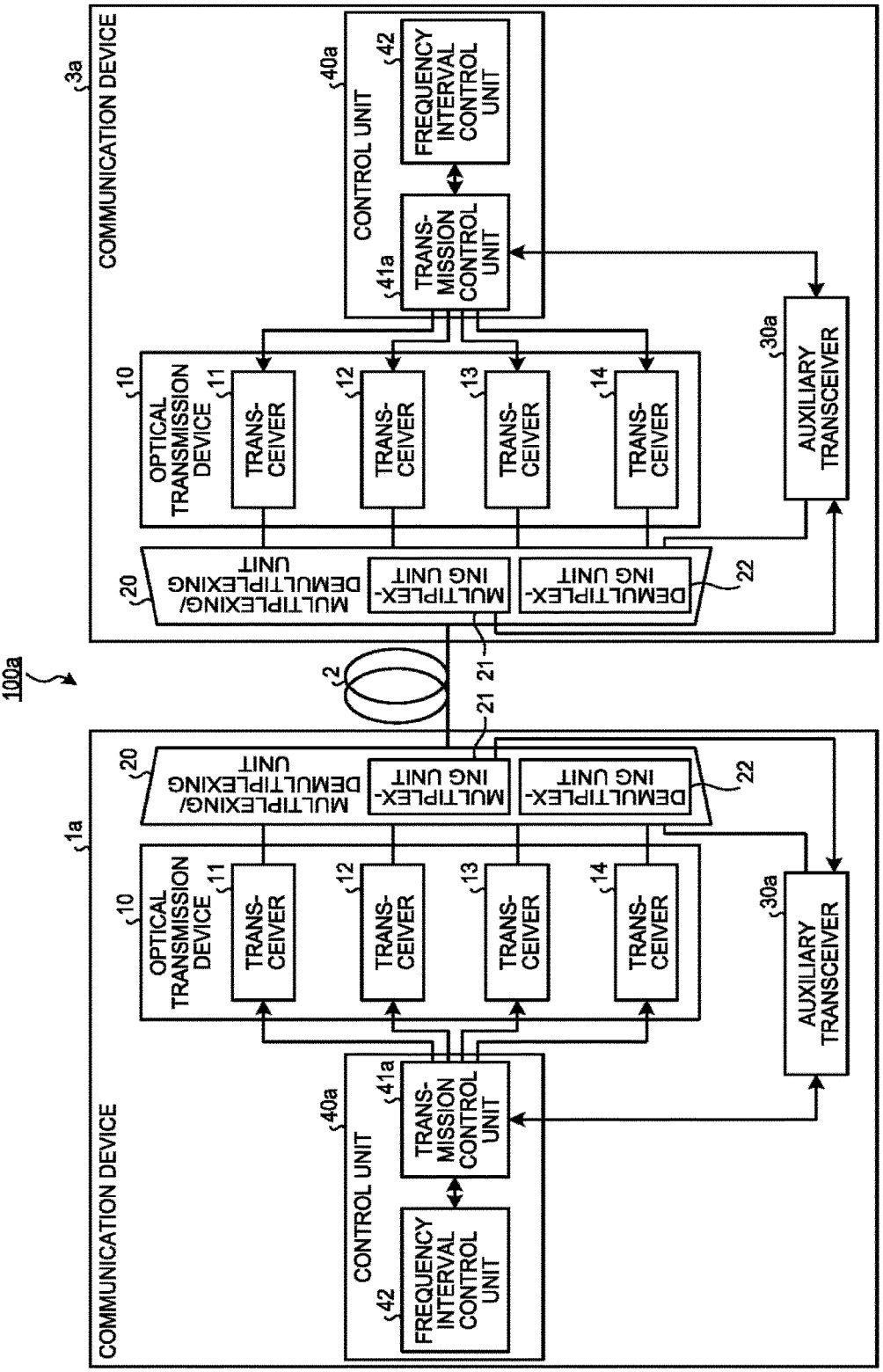
FIG. 7 is a diagram illustrating an exemplary configuration of an optical transmission system including communication apparatuses according to a second embodiment.

FIG. 7 is a diagram illustrating an exemplary configuration of an optical transmission system 100a including communication apparatuses 1a and 3a according to the second embodiment of the present invention. In the optical transmission system 100a, the communication apparatus 1a and the communication apparatus 3a communicate with each other through the transmission path 2 using optical signals subjected to the frequency multiplexing. Since the communication apparatuses 1a and 3a have the same configuration, hereinafter, the configuration and operation will be described using the communication apparatus 1a. The communication apparatus 1a includes the optical transmission device 10, an auxiliary transceiver 30a, and a control unit 40a. The optical transmission device 10 includes the transceivers 11 to 14 that transmit and receive optical signals at carrier wave frequencies different from one another. The auxiliary transceiver 30a receives the optical signal. The control unit 40a controls the carrier wave frequency of the optical signal transmitted by the control target transceiver. The communication apparatus 1a is the communication apparatus 1 of the first embodiment having the auxiliary transceiver 30 and the control unit 40 deleted and the auxiliary transceiver 30a and the control unit 40a added.

Figure 8:
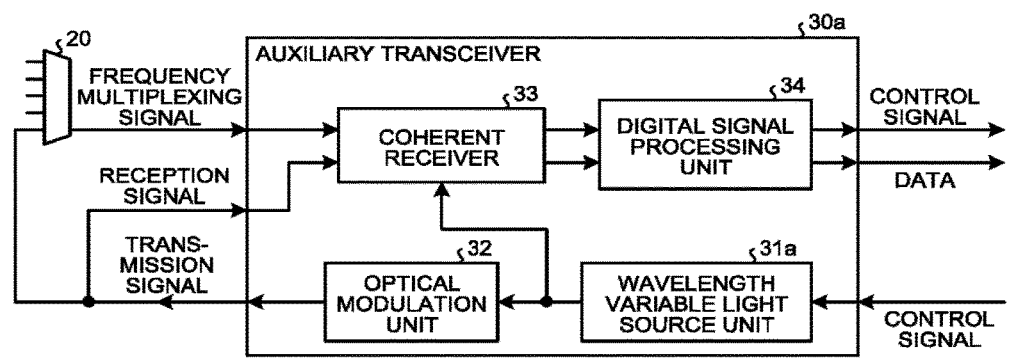
FIG. 8 is a block diagram illustrating an exemplary configuration of an auxiliary transceiver according to the second embodiment.

FIG. 8 is a block diagram illustrating an exemplary configuration of the auxiliary transceiver 30a according to the second embodiment of the present invention. The auxiliary transceiver 30a is the auxiliary transceiver 30 of the first embodiment having the wavelength variable light source unit 31 deleted and a wavelength variable light source unit 31a added. The wavelength variable light source unit 31a is a light source unit that performs the same operation as that of the wavelength variable light source unit 31 in the case of the operation in the first embodiment while being capable of changing the carrier wave frequency by a control signal from the control unit 40a and outputting a local emission light signal that is an optical signal, as described later, in the second embodiment. When any one of the transceivers 11 to 14 breaks down, the auxiliary transceiver 30a, which includes the same configuration as those of the transceivers 11 to 14, as in the auxiliary transceiver 30 of the first embodiment, can be used as an alternative transceiver to the broken transceiver.

Turning back to FIG. 7, the control unit 40a includes a transmission control unit 41a and a frequency interval control unit 42. The transmission control unit 41a performs the same operation as that of the transmission control unit 41 in the case of the operation in the first embodiment while controlling the operation of the transceivers 11 to 14 and the auxiliary transceiver 30a so that the carrier wave frequencies $f_1$ to $f_4$ used in the transceivers 11 to 14 of the communication apparatus 1a have predetermined carrier wave frequency intervals, in the second embodiment. The frequency interval control unit 42 receives setting for the predetermined carrier wave frequency intervals among the carrier wave frequencies $f_1$ to $f_4$ used in the transceivers 11 to 14, and calculates channel numbers used in the respective carrier wave frequencies $f_1$ to $f_4$ and frequency offset amounts.

Next, a discussion will be made as to control to set the predetermined carrier wave frequency intervals among the carrier wave frequencies of the transceivers 11 to 14, using the wavelength variable light source unit 31a incorporated in the auxiliary transceiver 30a of the communication apparatus 1a as a reference light source that outputs a local emission light signal that is a reference light, such that the optical signals are arranged with high accuracy. In the communication apparatus 1a, a channel number used in the wavelength variable light source unit 31a that is the reference and a frequency shift amount from a frequency grid at the channel number are calculated, whereby the optical signals can be arranged at the predetermined carrier wave frequency intervals. It is assumed herein that the wavelength variable light source unit 31a of the auxiliary transceiver 30a emits light at frequency intervals of 25-GHz grid, and has a frequency shift width of ±12.5 GHz. The frequency interval of 25-GHz grid means that a difference between the frequencies of the optical signals at the adjacent channel numbers is 25 GHz. The respective wavelength variable light source units 51 of the transceivers 11 to 14 and the wavelength variable light source unit 31a of the auxiliary transceiver 30a have the same specifications.

Figure 9:
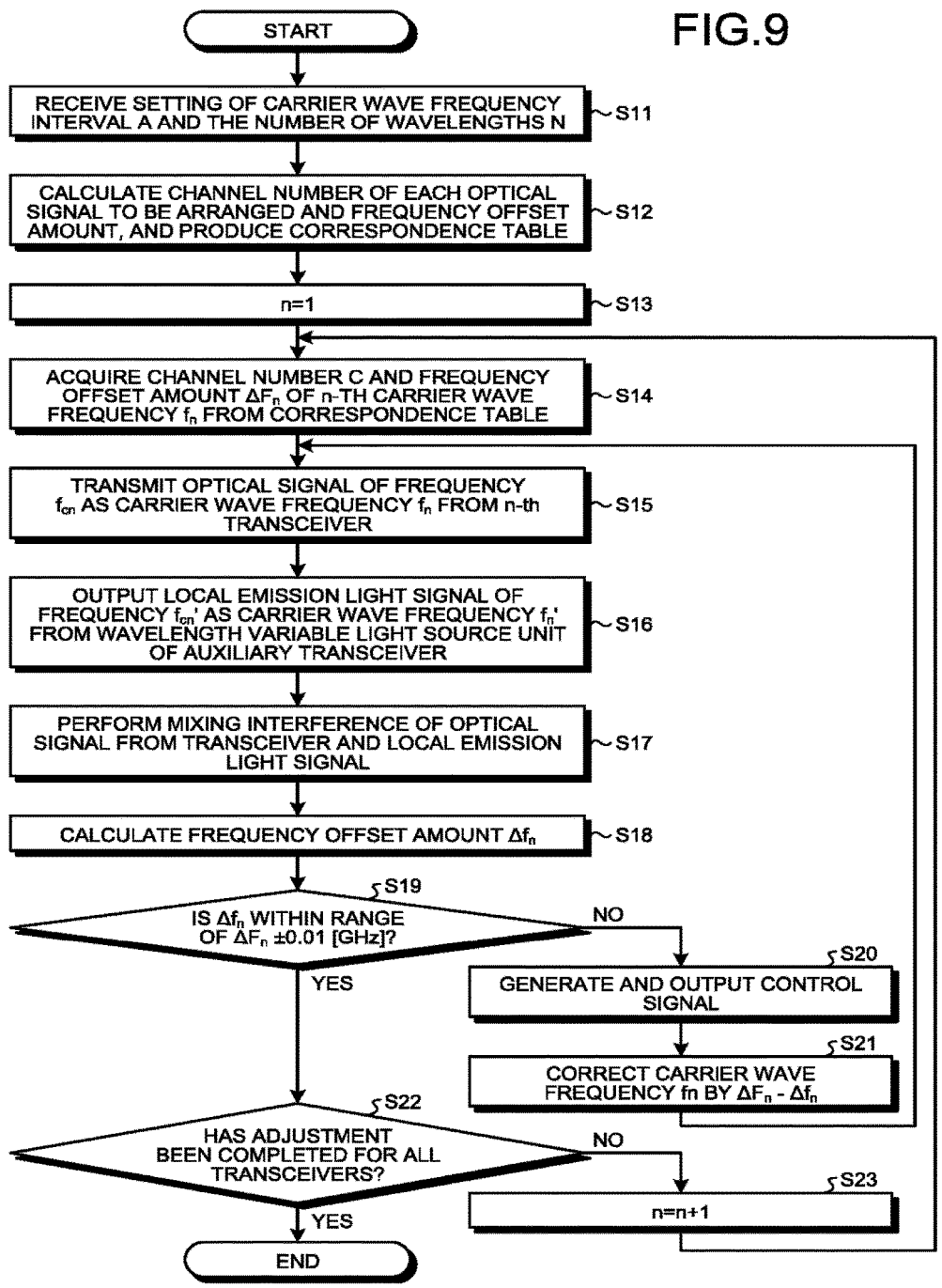
FIG. 9 is a flowchart illustrating operation of controlling carrier wave frequencies of transceivers so as to set predetermined carrier wave frequency intervals in the communication apparatus according to the second embodiment.

FIG. 9 is a flowchart illustrating the operation of controlling the carrier wave frequencies of the transceivers 11 to 14 so as to set the predetermined carrier wave frequency intervals in the communication apparatus 1a according to the second embodiment of the present invention.

First, in the communication apparatus 1a, the frequency interval control unit 42 receives, from an administrator or the like of the optical transmission system 100a, setting of the number of wavelengths N and the carrier wave frequency interval A of the optical signals transmitted from the respective wavelength variable light source units 51 of the transceivers 11 to 14 that are the targets in the optical transmission system 100a (step S11). This example is based on the assumption that, for example, the carrier wave frequency interval A is 40 GHz, i.e., A=40 GHz, and the number of wavelengths N is 4, i.e., N=4, which is the same as the number of transceivers in the optical transmission device 10.

Figure 10:
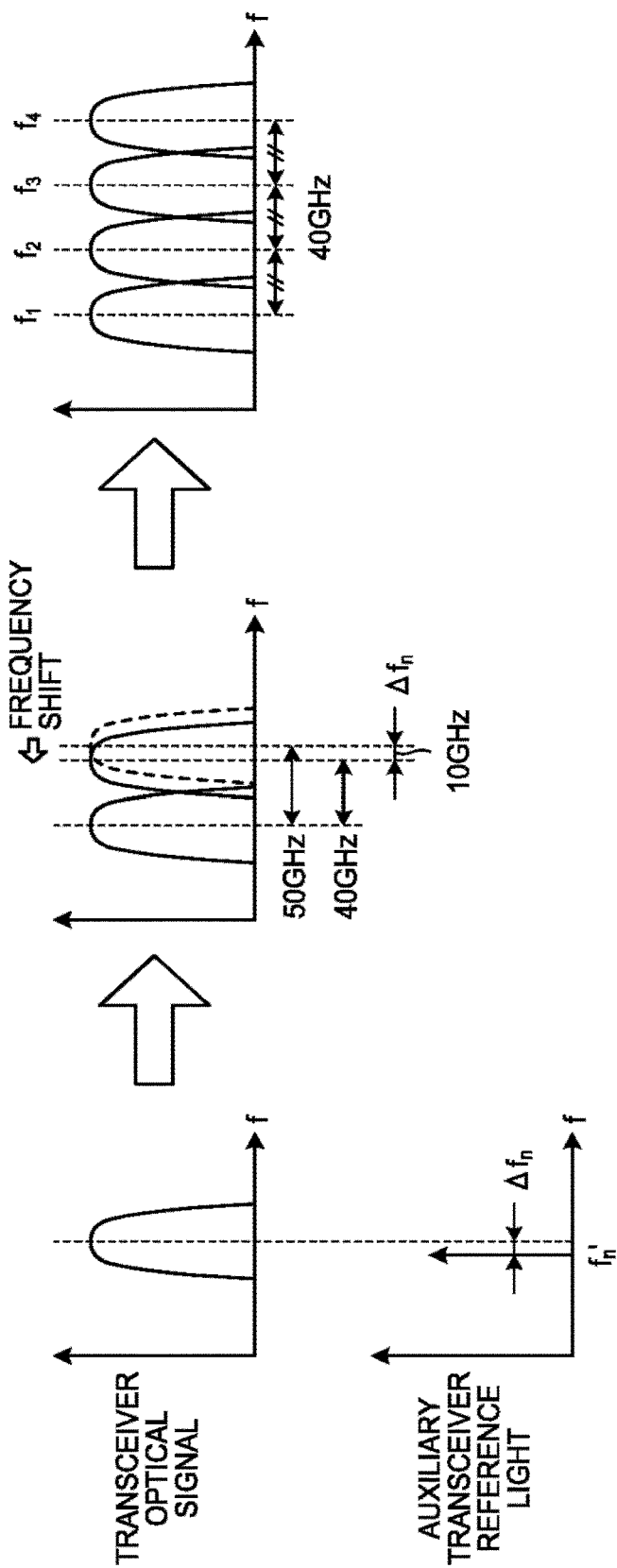
FIG. 10 is a diagram illustrating an image of a control method for the carrier wave frequency intervals in the communication apparatus according to the second embodiment.

FIG. 10 is a diagram illustrating an image of a control method for the carrier wave frequency intervals in the communication apparatus 1a according to the second embodiment. In the present embodiment, the wavelength variable light source unit 31a and the respective wavelength variable light source units 51 of the transceivers 11 to 14 emit light at the frequency intervals of 25-GHz grid as mentioned above. For example, in a case where a transmission signal from the wavelength variable light source unit 51 of some transceiver is used as a reference, a frequency higher by a frequency interval of 50 GHz amounting to the two sets of the frequency interval of 25-GHz grid is set for the wavelength variable light source unit 51 of the transceiver that performs the transmission at the adjacent carrier wave frequency, after which the frequency is shifted such that the frequency interval is reduced by 10 GHz in accordance with a correction instruction based on a comparison with the local emission light signal of the auxiliary transceiver 30a. Consequently, the carrier wave frequency interval of 40 GHz, 50−10=40 (GHz), can be realized between these two transceivers. The same control is performed for the two transceivers that perform the transmission at the adjacent carrier wave frequencies, whereby the 40 GHz interval of the carrier wave frequency that is used in each transceiver can be realized.

In response to receiving the setting of the carrier wave frequency interval A and the number of wavelengths N, the frequency interval control unit 42 calculates a channel number C of each optical signal to be arranged for the corresponding carrier wave frequency $f_n$, and a frequency offset amount $\Delta F_n$, i.e. a first frequency offset amount that is the frequency shift amount relative to a frequency $f_{C_n}'$ provided by the set channel number C. The frequency interval control unit 42 then produces a correspondence table indicating the channel number C and the frequency offset amount $\Delta F_n$ for each carrier wave frequency $f_n$ (step S12). Note that the apostrophic sign "'" given to each frequency is treated in the manner as discussed in the above-mentioned first embodiment.

Figures 11, 12:
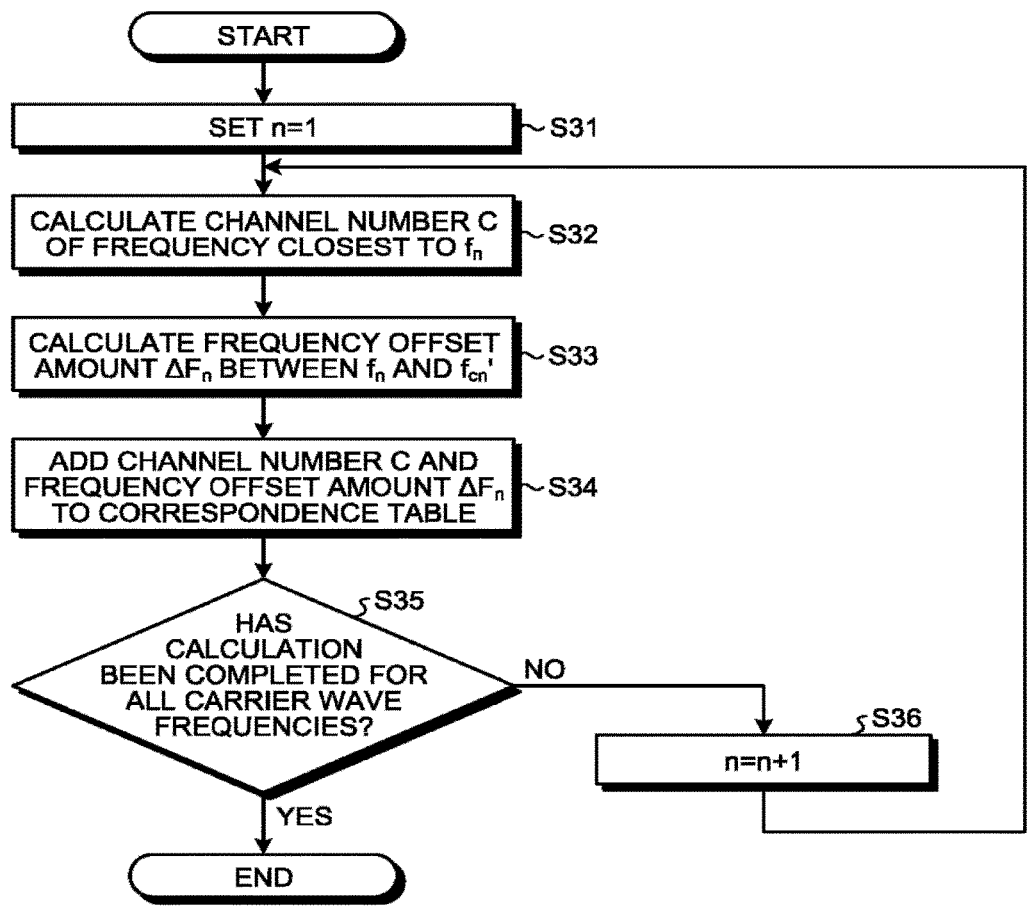
FIG. 11 is a flowchart illustrating operation of creating a correspondence table in a frequency interval control unit according to the second embodiment.
FIG. 12 is a diagram illustrating an example of the correspondence table created by the frequency interval control unit according to the second embodiment.

The operation of creating the correspondence table by the frequency interval control unit 42 will be described in detail. FIG. 11 is a flowchart illustrating the operation of creating the correspondence table in the frequency interval control unit 42 according to the second embodiment. In the frequency interval control unit 42, first, the identification number n of the carrier wave frequency is set to 1, i.e., n=1 (step S31).

The frequency interval control unit 42 calculates the channel number C of the closest frequency of the wavelength variable light source unit 31a to the carrier wave frequency $f_1$ (step S32). This example is based on the assumption that the carrier wave frequency $f_1$ is the smallest frequency in the optical signals to be subjected to the frequency multiplexing, and the channel number C of the closest frequency of the wavelength variable light source unit 31a to the carrier wave frequency $f_1$ is 1, i.e., C=1.

The frequency interval control unit 42 calculates a frequency offset amount $\Delta F_1$ between the carrier wave frequency $f_1$ and a frequency $f_{C1'}$ at which the wavelength variable light source unit 31a outputs the local emission light signal without the frequency shift when the channel number C is 1, i.e., C=1 (step S33). Since the frequency $f_{C1'}$ of the wavelength variable light source unit 31a is the smallest frequency in the frequency multiplexing signal, the frequency $f_{C1'}$ needs to be equal to the carrier wave frequency $f_1$, and thus the frequency offset amount $\Delta F_1$=0 GHz is set.

The frequency interval control unit 42 adds, to the correspondence table, information on the channel number C=1 and the frequency offset amount $\Delta F_1$=0 GHz of the wavelength variable light source unit 31a (step S34).

When the calculation of the channel numbers C and the frequency offset amounts $\Delta F_n$ has not been finished yet for all the carrier wave frequencies $f_1$ to $f_4$ (step S35: No), the frequency interval control unit 42 sets n=n+1, that is, adds an increment to n to set n=1+1=2 (step S36). Returning to step S32, then, the frequency interval control unit 42 performs the operations of steps S 32 to S34 to calculate the channel number C and a frequency offset amount $\Delta F_2$ for the carrier wave frequency $f_2$. The frequency interval control unit 42 also calculates the channel numbers C and frequency offset amounts $\Delta F_3$ and $\Delta F_4$ for the carrier wave frequencies $f_3$ and $f_4$ in the same manner, and completes the correspondence table. When the calculation of the channel numbers C and the frequency offset amounts $\Delta F_n$ has been completed for all the carrier wave frequencies $f_1$ to $f_4$ (step S35: Yes), the frequency interval control unit 42 finishes the operation of creating the correspondence table. The frequency interval control unit 42 stores the created correspondence table within the frequency interval control unit 42, or may store the created correspondence table in a storage unit (not illustrated) external to the frequency interval control unit 42.

FIG. 12 is a diagram illustrating an example of the correspondence table created by the frequency interval control unit 42 according to the second embodiment. The correspondence table indicates the channel numbers C and the frequency offset amounts $\Delta F_n$ for the respective carrier wave frequencies $f_1$ to $f_4$. For the carrier wave frequency $f_1$ that is the reference, the channel number C=1 and the frequency offset amount $\Delta F_1$=0 GHz are set.

For the carrier wave frequency $f_2$ adjacent to the carrier wave frequency $f_1$, the channel number C is set to C=3 that is two channels away from C=1. A frequency $f_{C3'}$ of the local emission light signal output from the wavelength variable light source unit 31a is 50 GHz larger than the frequency $f_{C1'}$ of the local emission light signal of the channel number C=1 of the carrier wave frequency $f_1$. In this case, since a frequency interval between the channel number C=1 and the channel number C=3 is 50 GHz, the frequency offset amount $\Delta F_2$=−10 GHz is set. Consequently, the frequency interval between the carrier wave frequency $f_1$ and the carrier wave frequency $f_2$ becomes 50−10=40 (GHz).

For the carrier wave frequency $f_3$ adjacent to the carrier wave frequency $f_2$, the channel number C is set to C=4 that is next to C=3. A frequency $f_{C4'}$ of the local emission light signal output from the wavelength variable light source unit 31a is 75 GHz larger than the frequency $f_{C1'}$ of the local emission light signal of the channel number C=1 of the carrier wave frequency $f_1$. In this case, since a frequency interval between the channel number C=1 and the channel number C=4 is 75 GHz, the frequency offset amount $\Delta F_3$=5 GHz is set. Consequently, the frequency interval between the carrier wave frequency $f_1$ and the carrier wave frequency $f_3$ becomes 75+5=80 GHz. As a result, the frequency interval between the carrier wave frequency $f_2$ and the carrier wave frequency $f_3$ becomes 80−40=40 (GHz) that is a value obtained by subtracting the frequency interval of 40 GHz between the carrier wave frequency $f_1$ and the carrier wave frequency $f_2$ from the frequency interval of 80 GHz between the carrier wave frequency $f_1$ and the carrier wave frequency $f_3$.

For the carrier wave frequency $f_4$ adjacent to the carrier wave frequency $f_3$, the channel number C is set to C=6 that is two channels away from C=4. A frequency $f_{C6'}$ of the local emission light signal output from the wavelength variable light source unit 31a is 125 GHz larger than the frequency $f_{C1'}$ of the local emission light signal of the channel number C=1 of the carrier wave frequency $f_1$. In this case, since a frequency interval between the channel number C=1 and the channel number C=6 is 125 GHz, the frequency offset amount $\Delta F_4$=−5 GHz is set. Consequently, the frequency interval between the carrier wave frequency $f_1$ and the carrier wave frequency $f_4$ becomes 125−5=120 (GHz). As a result, the frequency interval between the carrier wave frequency $f_3$ and the carrier wave frequency $f_4$ becomes 120−80=40 (GHz) that is a value obtained by subtracting the frequency interval of 80 GHz between the carrier wave frequency $f_1$ and the carrier wave frequency $f_3$ from the frequency interval of 120 GHz between the carrier wave frequency $f_1$ and the carrier wave frequency $f_4$.

Turning back to the flowchart in FIG. 9, when the creation of the correspondence table is completed in the frequency interval control unit 42, the transmission control unit 41a starts a process of controlling the frequency intervals of the carrier wave frequencies $f_1$ to $f_4$ of the transceivers 11 to 14. First, the transmission control unit 41a sets the identification number n of the carrier wave frequency to n=1 (step S13).

The transmission control unit 41a acquires, from the correspondence table of the frequency interval control unit 42, the channel number C=1 and the frequency offset amount $\Delta F_1$=0 GHz of the first carrier wave frequency $f_1$ (step S14). The transmission control unit 41a uses a control signal to output the information on the channel number C=1 of the first carrier wave frequency $f_1$ to the first transceiver 11 and the auxiliary transceiver 30a.

On the basis of the information on the channel number C=1 provided by the control signal from the transmission control unit 41a, the first transceiver 11 transmits, from the wavelength variable light source unit 51, the optical signal of a frequency $f_{C1}$ provided by the channel number C=1, as the optical signal of the carrier wave frequency $f_1$ (step S15).

On the basis of the information on the channel number C=1 provided by the control signal from the transmission control unit 41a, the auxiliary transceiver 30a outputs, as the local emission light signal of the carrier wave frequency $f_1'$ from the wavelength variable light source unit 31a, the local emission light signal of the frequency $f_{C1}'$ provided by the channel number C=1 that is the same setting as the channel number C=1 used in the wavelength variable light source unit 51 of the first transceiver 11 (step S16).

In the auxiliary transceiver 30a, the coherent receiver 33 performs the mixing interference of the optical signal of the carrier wave frequency $f_1$ from the transceiver 11 that is the output from the monitor port of the multiplexing unit 21, and the local emission light signal of the carrier wave frequency $f_1'$ input from the wavelength variable light source unit 31a (step S17). The coherent receiver 33 converts the optical signal extracted by the mixing interference into the electric signal for frequency-offset-amount calculation, and outputs this electric signal to the digital signal processing unit 34.

In the auxiliary transceiver 30a, the digital signal processing unit 34 calculates the frequency offset amount $\Delta f_1$ that is a second frequency offset amount by the digital signal processing using the electric signal input from the coherent receiver 33 (step S18). The digital signal processing unit 34 outputs, to the control unit 40a, the information on the calculated frequency offset amount $\Delta f_1$, as the control signal for the transceiver 11.

In the control unit 40a, the transmission control unit 41a compares the frequency offset amount $\Delta f_1$ provided by the control signal input from the digital signal processing unit 34 with the frequency offset amount $\Delta F_1$ acquired from the correspondence table illustrated in FIG. 12 (step S19).

When an error between the frequency offset amount $\Delta f_1$ and the frequency offset amount $\Delta F_1$ is not within a range of ±0.01 GHz, that is, the frequency offset amount $\Delta f_1$ is not within a range of 0±0.01 GHz (step S19: No), the transmission control unit 41a generates a control signal for causing the transceiver 11 to correct the carrier wave frequency $f_1$ of the optical signal by the amount of $\Delta F_1-\Delta f_1$, and outputs the control signal to the transceiver 11 that is the control target (step S20). Note that the range of the error, i.e. ±0.01 GHz, is only an example and not limited to this range. A different value may be used depending on the use and purpose of the optical transmission system 100a.

Then, the wavelength variable light source unit 51 of the transceiver 11 corrects the carrier wave frequency $f_1$ by the frequency offset amount $\Delta F_1-\Delta f_1$ on the basis of the control signal for the transceiver 11 generated in the transmission control unit 41a (step S21).

Returning to step S15, the communication apparatus 1a repeatedly executes the processing of step S15 to step S21 until the error between the frequency offset amount $\Delta f_1$ and the frequency offset amount $\Delta F_1$ becomes within the range of ±0.01 GHz. When the error becomes within the range of ±0.01 GHz (step S19: Yes), the transmission control unit 41a confirms whether the adjustment has been completed for all the transceivers (step S22).

When the adjustment has not been completed yet (step S22: No), the transmission control unit 41a sets n=n+1, that is, adds an increment to n to set n=1+1=2 (step S23). Then, returning to step S14, the transmission control unit 41a acquires, from the correspondence table of the frequency interval control unit 42, the channel number C=3 of the second smallest frequency that is the carrier wave frequency $f_2$ and the frequency offset amount $\Delta F_2=-10$ GHz (step S14).

By performing the operations of step S14 to step S21, the communication apparatus 1a executes control to calculate the frequency offset amount $\Delta f_2$ of the transceiver 12 and correct the carrier wave frequency $f_2$ of the transceiver 12.

Specifically, in the communication apparatus 1a, the carrier wave frequency $f_2$ transmitted from the wavelength variable light source unit 51 of the transceiver 12 is controlled to be within the range of −10±0.01 GHz with respect to the frequency $f_{C3}'$ of the channel number C=3 that is 50 GHz larger than that of the channel number C=1 by 50 GHz. More specifically, in the case of the carrier wave frequency $f_2$, the wavelength variable light source unit 51 of the transceiver 12 first transmits, as the carrier wave frequency $f_2$, the optical signal at a frequency $f_{C3}$ that is 50 GHz larger than that of the channel number C=1. In the auxiliary transceiver 30a, the wavelength variable light source unit 31a outputs, as the local emission light signal of the carrier wave frequency $f_2'$, the local emission light signal of the frequency $f_{C3}'$ that is provided by the channel number C=3 and 50 GHz larger than that provided by the channel number C=1. In the digital signal processing unit 34, since both the optical signal from the transceiver 12 and the local emission light signal from the wavelength variable light source unit 31a are presumed to have the frequencies that are 50 GHz larger than those of the channel number C 1, the frequency offset amount $\Delta f_2$ in the order of 0 GHz is predicted to be calculated.

In the control unit 40a, the transmission control unit 41a compares the frequency offset amount $\Delta F_2$ with the frequency offset amount $\Delta f_2$ provided by the control signal input from the digital signal processing unit 34. When an error between the frequency offset amount $\Delta f_2$ and the frequency offset amount $\Delta F_2$ is not within the range of ±0.01 GHz, that is, the frequency offset amount $\Delta f_2$ is not within the range of −10±0.01 GHz, the transmission control unit 41a generates a control signal for causing the transceiver 12 to correct the carrier wave frequency $f_2$ of the optical signal by the amount of $\Delta F_2-\Delta f_2$, and outputs the control signal to the transceiver 12. When the transceiver 12 first transmits the optical signal, the transmission control unit 41a generates the control signal for performing the correction by the amount of $\Delta F_2-\Delta f_2$, that is, in the order of (−10)−0=−10 (GHz), because $\Delta f_2$ is in the order of 0 GHz as mentioned above. The transmission control unit 41a then outputs this control signal to the transceiver 12.

In response to the correction instruction provided by the control signal from the transmission control unit 41a, the transceiver 12 transmits the optical signal of a frequency obtained by correcting, in the order of −10 GHz, the frequency $f_{C3}$ that is 50 GHz larger than that of the channel number C=1. In other words, the transceiver 12 transmits the optical signal of a frequency that is 40 GHz larger than that of the channel number C=1. The digital signal processing unit 34 of the auxiliary transceiver 30a presumes that the optical signal from the transceiver 12 has the frequency larger than that of the channel number C=1 by about 40 GHz. Therefore, the digital signal processing unit 34 is presumed to calculate the frequency offset amount $\Delta f_2$ of about −10 GHz. In the control unit 40a, the transmission control unit 41a generates the control signal for performing the correction by the amount of $\Delta F_2-\Delta f_2$, that is, in the order of (−10)−(−10)=0 (GHz), because $\Delta f_2$ is in the order of −10 GHz. The transmission control unit 41a then outputs this control signal to the transceiver 12 that is the control target. This operation is repeatedly performed in the communication apparatus 1a. When Yes is obtained in step S19 of the flowchart illustrated in FIG. 9, the arrangement of the two optical signals can be realized using the frequency interval of 40 GHz between the carrier wave frequency $f_1$ and the carrier wave frequency $f_2$.

Similarly, the communication apparatus 1a performs the operations of step S14 to step S21 on the carrier wave frequencies $f_3$ and $f_4$ to perform the control over the carrier wave frequency intervals. When the adjustment of the carrier wave frequencies has been completed for all the transceivers (step S22: Yes), the operation of performing the control to obtain the predetermined carrier wave frequency intervals is finished.

In the present embodiment, the digital signal processing unit 34 generates the same control signal as that discussed the first embodiment, and the transmission control unit 41a of the control unit 40a compares the frequency offset amount $\Delta f_n$ based on the control signal acquired from the digital signal processing unit 34 with the frequency offset amount $\Delta F_n$ acquired from the frequency interval control unit 42, and generates and outputs the control signal on the basis of the comparison result. However, the present embodiment is not limited to this example. For example, the transmission control unit 41a may use the control signal to output, to the digital signal processing unit 34, the information on the frequency offset amount $\Delta F_n$ acquired from the frequency interval control unit 42, and the digital signal processing unit 34 may compare the calculated frequency offset amount $\Delta f_n$ with the frequency offset amount $\Delta F_n$ acquired from the frequency interval control unit 42, and generate the control signal on the basis of the comparison result. In this case, the transmission control unit 41a outputs, to the transceiver that is the control target, the control signal for the transceiver input from the digital signal processing unit 34 in the same manner as discussed in the first embodiment.

Alternatively, the transmission control unit 41a may use the control signal to output, to the transceivers 11 to 14, the information on the frequency offset amount $\Delta F_n$ acquired from the frequency interval control unit 42. Since the transceivers 11 to 14 output the optical signals corrected by the frequency offset amounts $\Delta F_n$ from the beginning, the operation of performing the control to obtain the predetermined carrier wave frequency intervals can be finished in a short time in the communication apparatus 1a as compared with a case where the information of the frequency offset amounts $\Delta F_n$ acquired from the frequency interval control unit 42 is not output to the transceivers 11 to 14.

In the present embodiment, a hardware configuration of the auxiliary transceiver 30a illustrated in FIG. 8 can be realized by the same hardware configuration as that in the first embodiment illustrated in FIG. 6. The control unit 40a including the transmission control unit 41a and the frequency interval control unit 42 can be realized by the processor 61 and the memory 62 illustrated in FIG. 6.

As described above, in the communication apparatus 1a according to the present embodiment, the optical signals transmitted from the transceivers 11 to 14 are arranged at the predetermined carrier wave frequency intervals by using the carrier wave frequency of the wavelength variable light source unit 31a provided in the auxiliary transceiver 30a as the reference. Consequently, the carrier wave frequency intervals can be adjusted with high accuracy in the optical transmission system 100a, and the flexible carrier wave frequency intervals suitable for the system can be realized. Since the communication apparatus 1a uses the function of fine adjustment of the wavelength variable light source units 51 of the transceivers 11 to 14 and the wavelength variable light source unit 31a of the auxiliary transceiver 30a, the carrier waves can be arranged at the predetermined carrier wave frequency intervals regardless of the grids of the respective wavelength variable light source units. In the communication apparatus 1a, it is possible to control the carrier wave at the designated frequency, and perform the frequency control with high accuracy of 100 MHz or less.

Third Embodiment

The second embodiment has described as to the case where the optical signals that are the four subcarriers are arranged at the frequency intervals of 40 GHz. The present embodiment describes a case where the frequency intervals of the optical signals are not constant but vary depending on the frequency band. Specifically, the present embodiment describes a case where a wavelength number 1 including the four optical signals subjected to the frequency multiplexing at the frequency intervals of 40 GHz and a wavelength number 2 including three optical signals subjected to the frequency multiplexing at frequency intervals of 33.3 GHz are subjected to the frequency multiplexing at a frequency interval of 50 GHz.

Figure 13:
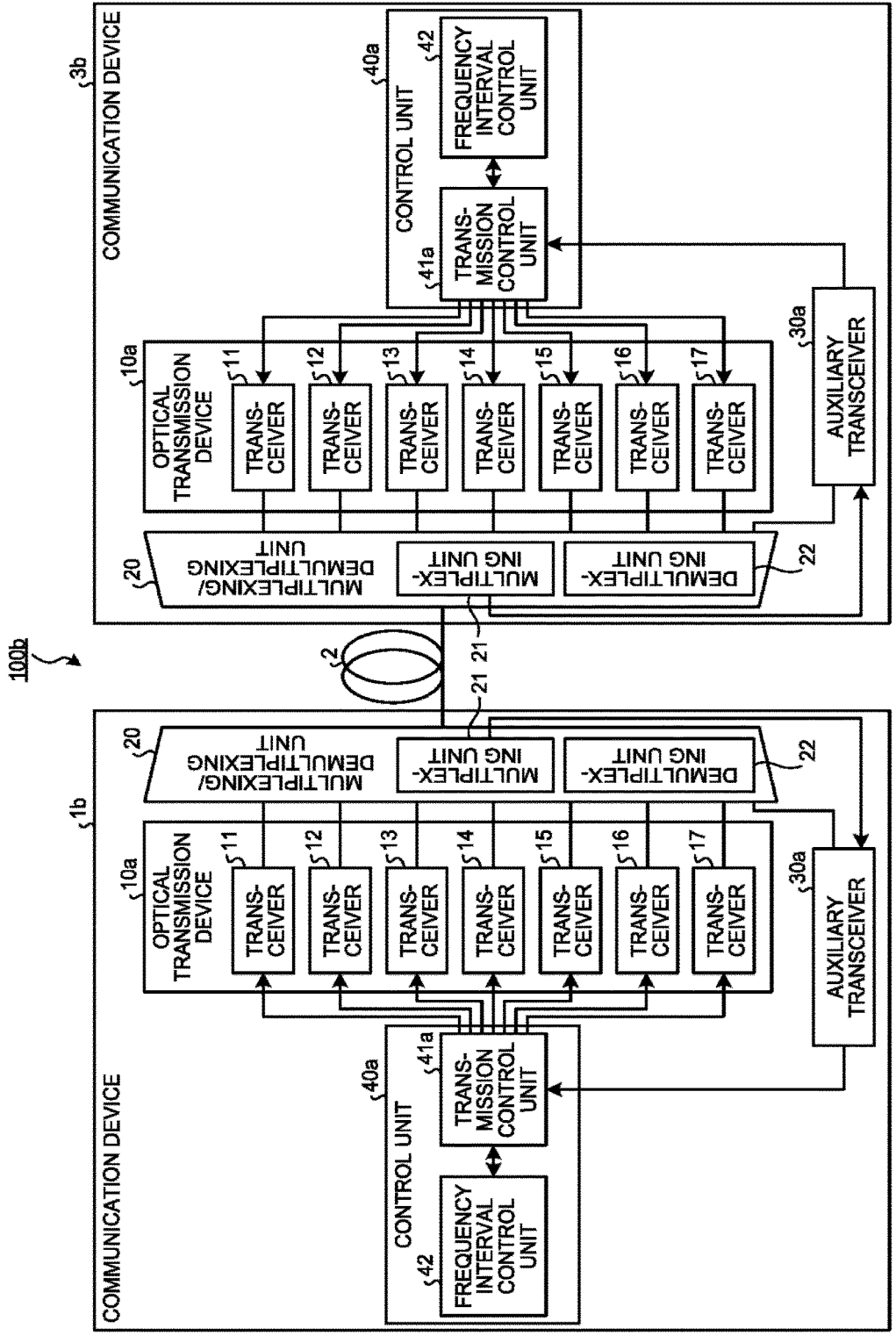
FIG. 13 is a diagram illustrating an exemplary configuration of an optical transmission system including communication apparatuses according to a third embodiment.

FIG. 13 is a diagram illustrating an exemplary configuration of an optical transmission system 100b including communication apparatuses 1b and 3b according to a third embodiment of the present invention. In the optical transmission system 100b, the communication apparatus 1b and the communication apparatus 3b communicate with each other through the transmission path 2 using optical signals subjected to the frequency multiplexing. Since the communication apparatuses 1b and 3b have the same configuration, hereinafter, the configuration and operation will be described using the communication apparatus 1b.

The communication apparatus 1b is the communication apparatus 1a of the second embodiment having the optical transmission device 10 deleted and an optical transmission device 10a added. The optical transmission device 10a includes transceivers 11 to 17. The optical transmission device 10a has the configuration of the optical transmission device 10 having the transceivers 15 to 17 added. The transceivers 15 to 17 have the same configurations as those of the transceivers 11 to 14.

Figures 14, 15:
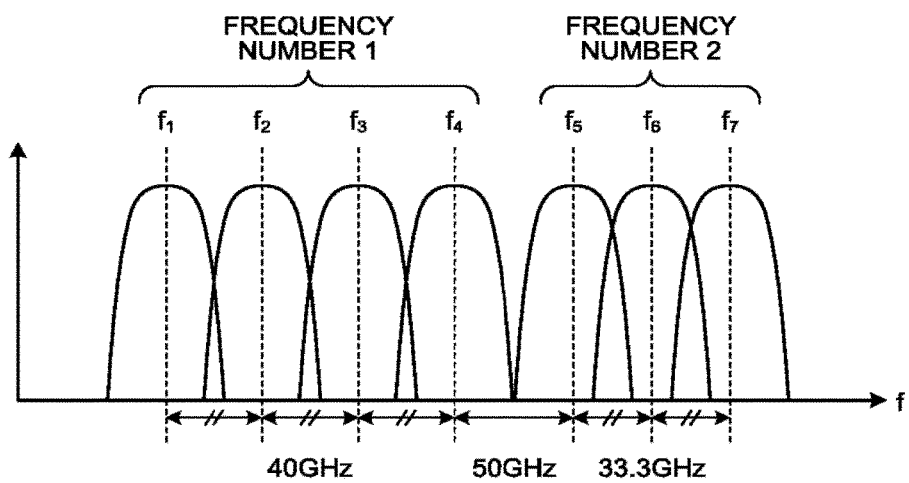
FIG. 14 is a diagram illustrating an image of a control method for carrier wave frequency intervals in the communication apparatus according to the third embodiment.
FIG. 15 is a diagram illustrating an example of a correspondence table created by a frequency interval control unit according to the third embodiment.

FIG. 14 is a diagram illustrating an image of a control method for the carrier wave frequency intervals in the communication apparatus 1b according to the third embodiment. The carrier wave frequencies $f_1$ to $f_4$ of the wavelength number 1 correspond to the transceivers 11 to 14, and carrier wave frequencies $f_5$ to $f_7$ of the wavelength number 2 correspond to the transceivers 15 to 17. In other words, the part constituted by the wavelength number 1 is is the same as that discussed in the second embodiment.

In the third embodiment, a flowchart of the operation of the communication apparatus 1b to control the carrier wave frequencies of the transceivers 11 to 17 so as to obtain the predetermined carrier wave frequency intervals is the same as the flowchart of FIG. 9 in the second embodiment except that the carrier wave frequency interval A and the number of wavelengths N set in step S11 and the correspondence table created in step S12 correspond to the seven carrier wave frequencies $f_1$ to $f_7$. FIG. 15 is a diagram illustrating an example of the correspondence table created by the frequency interval control unit 42 according to the third embodiment. The elements listed corresponding to the carrier wave frequencies $f_1$ to $f_4$ are the same as those in FIG. 12 of the second embodiment.

At the carrier wave frequency $f_5$ adjacent to the carrier wave frequency $f_4$, the channel number C is set to C=8 that is two channels away from C=6. A frequency $f_{C8}'$ of the local emission light signal output from the wavelength variable light source unit 31a is 175 GHz larger than the frequency $f_{C1}'$ of the local emission light signal of the channel number C=1 of the carrier wave frequency $f_1$. In this case, since a frequency interval between the channel number C=1 and the channel number C=8 is 175 GHz, a frequency offset amount $\Delta F_5 = -5$ GHz is set. Consequently, the frequency interval between the carrier wave frequency $f_1$ and the carrier wave frequency $f_5$ becomes 175−5=170 GHz. As a result, the frequency interval between the carrier wave frequency $f_4$ and the carrier wave frequency $f_5$ becomes 170−120=50 (GHz) that is a value obtained by subtracting the frequency interval of 120 GHz between the carrier wave frequency $f_1$ and the carrier wave frequency $f_4$ from the frequency interval of 170 GHz between the carrier wave frequency $f_1$ and the carrier wave frequency $f_5$.

At the carrier wave frequency $f_6$ adjacent to the carrier wave frequency $f_5$, the channel number C is set to C=9 that is next to C=8. A frequency $f_{C9}'$ of the local emission light signal output from the wavelength variable light source unit 31a is 175 GHz larger than the frequency $f_{C1}'$ of the local emission light signal of the channel number C=1 of the carrier wave frequency $f_1$. In this case, since a frequency interval between the channel number C=1 and the channel number C=9 is 200 GHz, a frequency offset amount $\Delta F_6 = 3.3$ GHz is set. Consequently, the frequency interval between the carrier wave frequency $f_1$ and the carrier wave frequency $f_6$ becomes 203.3 GHz. As a result, the frequency interval between the carrier wave frequency $f_5$ and the carrier wave frequency $f_6$ becomes 203.3−170=33.3 (GHz) that is a value obtained by subtracting the frequency interval of 170 GHz between the carrier wave frequency $f_1$ and the carrier wave frequency $f_5$ from the frequency interval of 203.3 GHz between the carrier wave frequency $f_1$ and the carrier wave frequency $f_6$.

At the carrier wave frequency $f_7$ adjacent to the carrier wave frequency $f_6$, the channel number C is set to C=10 that is next to C=9. A frequency $f_{C10}'$ of the local emission light signal output from the wavelength variable light source unit 31a is 225 GHz larger than the frequency $f_{C1}'$ of the local emission light signal of the channel number C=1 of the carrier wave frequency $f_1$. In this case, since a frequency interval between the channel number C=1 and the channel number C=10 is 225 GHz, a frequency offset amount $\Delta F_7 = 11.6$ GHz is set. Consequently, the frequency interval between the carrier wave frequency $f_1$ and the carrier wave frequency $f_7$ becomes 236.6 GHz. As a result, the frequency interval between the carrier wave frequency $f_6$ and the carrier wave frequency $f_7$ becomes 236.6−203.3=33.3 (GHz) that is a value obtained by subtracting the frequency interval of 203.3 GHz between the carrier wave frequency $f_1$ and the carrier wave frequency $f_6$ from the frequency interval of 236.6 GHz between the carrier wave frequency $f_1$ and the carrier wave frequency $f_7$.

In this manner, when the carrier wave frequency $f_1$ that is the smallest frequency in the optical signals to be subjected to the frequency multiplexing is defined as the reference, the arrangement of the respective optical signals can be defined using the distances from the reference frequency. Therefore, even in the system having the frequency intervals that vary depending on the frequency band, the control can be flexibly performed to obtain the different frequency intervals.

In the third embodiment, the number of times of return to step S14 via step S23 in the flowchart illustrated in FIG. 9 is increased three times due to the transceivers 15 to 17.

As described above, in the communication apparatus 1b according to the present embodiment, the optical signals transmitted from the transceivers 11 to 17 are arranged at the predetermined carrier wave frequency intervals by using the carrier wave frequency of the wavelength variable light source unit 31a provided in the auxiliary transceiver 30a as the reference. Consequently, the same effect as that of the second embodiment can be obtained in the optical transmission system 100b, and the carrier wave frequency intervals can be set to the different intervals.

The configuration described in the above-mentioned embodiments indicates an example of the contents of the present invention. The configuration can be combined with another well-known technique, and a part of the configuration can be omitted or changed without departing from the gist of the present invention.

REFERENCE SIGNS LIST 1, 1a, 1b, 3, 3a, 3b communication apparatus, 2 transmission path, 10 optical transmission device, 11, 12, 13, 14, 15, 16, 17 transceiver, 20 multiplexing/demultiplexing unit, 21 multiplexing unit, 22 demultiplexing unit, 30, 30a auxiliary transceiver, 31, 31a, 51 wavelength variable light source unit, 32, 52 optical modulation unit, 33, 53 coherent receiver, 34, 54 digital signal processing unit, 40, 40a control unit, 41, 41a transmission control unit, 42 frequency interval control unit, 61 processor, 62 memory, 63 optical signal generation unit, 64 input unit, 65 output unit, 66 system bus, 100, 100a, 100b optical transmission system.

The invention claimed is:

1. A carrier wave frequency control method for a communication apparatus comprising an optical transmission device including a plurality of transceivers to transmit and receive optical signals at carrier wave frequencies different from one another, an auxiliary transceiver to receive the optical signals, the auxiliary transceiver being a spare transceiver for the plurality of transceivers, and a control unit to control the carrier wave frequency of the optical signal transmitted by one of the plurality of transceivers as a control target transceiver, the carrier wave frequency control method comprising:

receiving a setting of a frequency interval between the carrier wave frequencies of the respective optical signals transmitted from the plurality of transceivers and a number of wavelengths that is a number of the transceivers;

calculating, for a light source provided in each of the plurality of transceivers and capable of changing the carrier wave frequency at a pre scribed frequency grid and outputting the optical signal, a channel number used in the light source of each of the transceivers and a first frequency offset amount on a basis of the setting;

outputting, from the control target transceiver, the optical signal by the channel number;

outputting a local emission light signal by a setting of the same channel number as the channel number used in the light source of the control target transceiver;

converting, into an electric signal, an optical signal extracted by mixing interference of the optical signal output from the control target transceiver by the channel number and the local emission light signal;

using the electric signal to calculate a second frequency offset amount between the carrier wave frequency of the optical signal transmitted by the control target transceiver and the carrier wave frequency of the local emission light signal;

comparing the first frequency offset amount with the second frequency offset amount, and generating and outputting a control signal for the control target transceiver to correct the carrier wave frequency of the optical signal when an error between the first frequency offset amount and the second frequency offset amount is not within a prescribed range; and correcting the carrier wave frequency of the optical signal on the basis of the control signal generated in the control unit.

* * * * *